(12) United States Patent
Mae et al.

(10) Patent No.: US 8,895,666 B2
(45) Date of Patent: Nov. 25, 2014

(54) (METH)ACRYLIC POLYMER PARTICLE, PROCESS FOR PRODUCTION OF THE PARTICLE, PLASTISOL, AND ARTICLE

(75) Inventors: Satoshi Mae, Toyohashi (JP); Hiroyasu Irie, Otake (JP); Toshihiro Kasai, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 1080 days.

(21) Appl. No.: 12/280,487

(22) PCT Filed: Feb. 23, 2007

(86) PCT No.: PCT/JP2007/053416
§ 371 (c)(1),
(2), (4) Date: Aug. 22, 2008

(87) PCT Pub. No.: WO2007/097428
PCT Pub. Date: Aug. 30, 2007

(65) Prior Publication Data
US 2009/0137740 A1 May 28, 2009

(30) Foreign Application Priority Data
Feb. 23, 2006 (JP) ................................. 2006-046383

(51) Int. Cl.
*C08F 265/04* (2006.01)
*C08F 265/06* (2006.01)
*C08L 83/04* (2006.01)
*C08L 51/00* (2006.01)

(52) U.S. Cl.
CPC ............. *C08F 265/04* (2013.01); *C08F 265/06* (2013.01); *C08L 51/003* (2013.01); *C08L 83/04* (2013.01); *Y10S 525/902* (2013.01)
USPC ............................. 525/124; 525/902; 523/201

(58) Field of Classification Search
CPC .... C08F 265/04; C08F 265/06; C08L 51/003; C08L 83/04
USPC .................... 525/902, 124; 523/201
See application file for complete search history.

(56) References Cited

U.S. PATENT DOCUMENTS

| 4,071,653 A | 1/1978 | Boessler et al. |
| 4,199,486 A | 4/1980 | Boessler et al. |
| 4,210,567 A | 7/1980 | Kösters |
| 5,342,898 A | 8/1994 | Seitz et al. |
| 5,474,783 A | 12/1995 | Miranda et al. |
| 5,554,494 A * | 9/1996 | Shiratsuchi et al. .......... 430/523 |
| 5,622,813 A * | 4/1997 | Kanda et al. ................ 430/281.1 |
| 5,840,786 A | 11/1998 | Beck et al. |
| 6,559,236 B1 | 5/2003 | Willimann et al. |
| 2001/0016612 A1 | 8/2001 | Kasai |
| 2004/0059023 A1 * | 3/2004 | Loehden et al. .............. 523/201 |
| 2004/0086569 A1 | 5/2004 | Sparer et al. |
| 2004/0131855 A1 | 7/2004 | Ganapathiappan |
| 2005/0136272 A1 * | 6/2005 | VanRheenen ................. 428/500 |
| 2006/0211805 A1 | 9/2006 | Willimann et al. |
| 2007/0259987 A1 * | 11/2007 | Schattka et al. ............. 523/105 |
| 2008/0293854 A1 | 11/2008 | Schattka et al. |

FOREIGN PATENT DOCUMENTS

| DE | 27 22 752 A1 | 11/1978 |
| DE | 10 2004 030 404 A1 | 1/2006 |
| EP | 0 557 944 A1 | 9/1993 |
| EP | 1 217 037 A1 | 6/2002 |
| EP | 1 382 634 A2 | 1/2004 |
| EP | 1 382 634 A3 | 1/2004 |
| JP | 51-71344 | 6/1976 |
| JP | 52-42590 | 4/1977 |
| JP | 4-225010 | 8/1992 |
| JP | 2002-521506 | 7/2002 |
| JP | 2002-521511 | 7/2002 |
| JP | 2002-226596 | 8/2002 |
| JP | 2003-128736 | 5/2003 |
| JP | 2004-027233 | 1/2004 |
| JP | 2004-211089 | 7/2004 |
| JP | 2005-299006 | 10/2005 |
| JP | 2006-219559 | 8/2006 |
| WO | WO 2006/010465 A1 | 2/2006 |

OTHER PUBLICATIONS

U.S. Appl. No. 12/524,255, filed Jul. 23, 2009, Mae.
Supplementary European Search Report issued Dec. 2, 2010 in Europe Patent Application No. 08 70 3697.
Robert F. Fedors, et al., "A Method for Estimating Both the Solubility Parameters and Molar Volumes of Liquids", Polymer Engineering and Science, Brookfield Center, vol. 14, No. 2, XP-008069569, Feb. 1, 1974, pp. 147-154.
Christian Wohlfarth, "Solubility Parameters of Selected Polymers", CRC Handbook of Chemistry and Physics, 91st Edition, XP-002608010, 2010, pp. 13-70-13-71 (with an additional page).
Aldrich Sigma, "Reference: Polymer Properties", Polymer Products from Aldrich, XP-002608011, Nov. 3, 2010, pp. 46-49.

* cited by examiner

*Primary Examiner* — Mark Kaucher
(74) *Attorney, Agent, or Firm* — Oblon, Spivak, McClelland, Maier & Neustadt, L.L.P.

(57) ABSTRACT

A method for producing a (meth)acrylic polymer particle comprises polymerizing a monomer (X) having a (meth) acryloyl group to produce a polymer particle, and polymerizing a monomer mixture (Y) in the presence of the polymer particle, in which the monomer (X) is 90 to 99.9% by mass and the monomer mixture (Y) is 0.01 to 10% by mass in terms of the ratio among monomer raw materials to be supplied for polymerization; and the monomer mixture (Y) comprises 1 to 80% by mol of a monomer (a) having a basic nitrogen atom or having a blocked isocyanate as a functional group, 5 to 80% by mol of a (meth)acrylate monomer (b) of at least one alcohol selected from the group consisting of an aliphatic alcohol having 2 or more carbon atoms, an aromatic alcohol, and a cyclic alkyl alcohol, and 0 to 94% by mol of a monomer (c) other than the monomer (a) and the monomer (b).

13 Claims, No Drawings

(METH)ACRYLIC POLYMER PARTICLE, PROCESS FOR PRODUCTION OF THE PARTICLE, PLASTISOL, AND ARTICLE

TECHNICAL FIELD

The present invention relates to a (meth)acrylic polymer particle which has an excellent balance between adhesibility to a base material and storage stability, a method for producing the same, a plastisol composition using the same, and an article to be obtained by using the same.

The present application claims the priority of Japanese Patent Application No. 2006-046383 filed at the Japan Patent Office on Feb. 23, 2006, the contents of which are hereby incorporated herein by reference.

BACKGROUND ART

Plastisols in which polymer fine particles are dispersed in a plasticizer as a medium have been used in various fields of industry such as automotive undercoats, auto body sealers, wall papers, carpet backings, floor materials, paints, and toys.

Conventionally, plastisols have mostly been vinyl chloride sols using vinyl chloride polymer particles. In recent years, a shift to (meth)acrylic plastisols using (meth)acrylic polymer particles (hereinafter, expressed as "acrylic sols") has been investigated from the consideration of global environment and the like. The acrylic sols do not generate toxic dioxins or halogenated hydrogen gases that are a factor of acid rain when products produced from the acrylic sols are incinerated because the acrylic sols do not contain halogen atoms.

The shift from vinyl chloride sols to the acrylic sols is being positively advanced, in particular, in the uses of automotive undercoats and auto body sealers. The reason of this is, in addition to the above environmental problem, to exclude vinyl chloride sols that generate hydrogen chloride and the like that cause damage of equipment at a melting step of shredder dust at the time of recycling automotives.

Generally, in the uses of automotive undercoats and auto body sealers, adhesives are compounded to plastisol compositions for the purpose of giving adhesibility because it is required for a coating film to adhere strongly and closely to a body base material. However, the adhesives are highly viscous liquid materials, and hence, stringiness or sagging tends to occur and thereby workability tends to be lowered at the time of coating the plastisols.

Further, there is a tendency that material costs of the acrylic sols become higher as compared with those of vinyl chloride sols. As a main cause of this, the fact that raw material cost of (meth)acrylic polymer particles tends to be raised and adhesives, curing agents, and anti-sagging agents tend to be compounded in great quantities can be listed.

Although various proposals have been offered to solve the problems of occurrence of stringiness or sagging at the time of coating acrylic sols and costs of compounding materials, the most effective measure is the curtailment of the adhesives.

Methods for curtailing the adhesives are proposed, for example, in Patent Document 1 and Patent Document 2. In Patent Document 1, a technology for giving acrylic sols excellent adhesibility by copolymerizing a heterocyclic compound having at least one nitrogen atom with a (meth)acrylic polymer particle is proposed. Further, in Patent Document 2, a technology for improving storage stability of acrylic sols and giving acrylic sols adhesibility by adding and polymerizing the whole or the most part of a monomer having a basic nitrogen atom after at least half of another copolymerizable monomer is polymerized has been proposed.

However, in both technologies, storage stabilities are insufficient at a temperature of 30 to 40° C. or above, which is an industrial operating environment, though they are excellent at a room temperature.

In Patent Document 3, a plastisol composition containing a plasticizer and a particulate polymer mixture composed of at least two components A and B is described.

In the case of using the technology of Patent Document 2 or 3, there is a tendency that a resin having excellent storage stability is insufficient in adhesive strength, while a resin having excellent adhesive strength is insufficient in storage stability, and hence, it is difficult to keep the balance between both the performances. As the reason of this, when the polymer have excellent compatibility with a plasticizer, it is presumed that a polymer having basic nitrogen atoms which is an adhesive component become easily movable to the interface of a resin and a base material at the time of baking, so that adhesibility tends to be improved, at the same time, the polymer easily absorb the plasticizer at the time of storage, so that viscosity change of acrylic sols become large and storage stability tend to become insufficient. On the other hand, it is also presumed that, in the case that the polymer is incompatible with the plasticizer, the viscosity change of acrylic sols become small owing to the difficulty of absorption of the plasticizer by the polymer at the time of storage, however, the polymer become hard to move to the interface of the resin and the base material at the time of baking, so that adhesibility tend to be insufficient.

An example of using a monomer having a blocked isocyanate as a functional group is proposed in Patent Document 4, however, the balance between storage stability and adhesive strength is not kept, which is same as in the above-mentioned case.

Patent Document 1: Japanese Patent Application Laid-Open No. 51-71344
Patent Document 2: Japanese Patent Application Laid-Open No. 52-42590
Patent Document 3: Japanese Patent Application Laid-Open No. 2004-27233
Patent Document 4: Japanese Patent Application Laid-Open No. 2006-299006

DISCLOSURE OF INVENTION

Problem to be Solved by the Invention

A subject of the present invention is to provide a (meth)acrylic polymer particle which can realize compatibility of adhesibility and storage stability in high degree in the case that it is used in plastisols and can be used commercially; a plastisol using the same; and an article using the same.

Means for Solving the Problem

A method for producing a (meth)acrylic polymer particle of the present invention comprises: polymerizing a monomer (X) having a (meth)acryloyl group (hereinafter, expressed as "monomer (X)") to produce a polymer particle, and polymerizing a monomer mixture (Y) in the presence of the polymer particle, in which the monomer (X) is 90 to 99.9% by mass and the monomer mixture (Y) is 0.01 to 10% by mass in terms of the ratio among the monomer raw materials to be supplied for polymerization; and the monomer mixture (Y) comprises 1 to 80% by mol of a monomer (a) having a basic nitrogen atom or having a blocked isocyanate as a functional group (hereinafter, expressed as "monomer (a)"), 5 to 80% by mol of a (meth)acrylate monomer (b) of at least one alcohol selected from the group consisting of an aliphatic alcohol having 2 or more carbon atoms, an aromatic alcohol, and a cyclic alkyl alcohol (hereinafter, expressed as (monomer (b)), and 0 to 94% by mol of a monomer (c) other than the monomer (a) and the monomer (b).

A (meth)acrylic polymer particle of the present invention is obtained by the foregoing method.

A plastisol composition of the present invention comprises the foregoing (meth)acrylic polymer particle, and an article of the present invention comprises the foregoing plastisol composition.

Effect of the Invention

The (meth)acrylic polymer particle, and the plastisol and the article using the (meth)acrylic polymer particle of the present invention can realize compatibility of adhesibility and storage stability in high degree in the case that it is used in plastisols and can be used commercially. This is industrially very significant and exerts considerable effects on global environmental conservation.

BEST MODE FOR CARRYING OUT THE INVENTION

Hereinafter, the present invention will be explained in detail.

In the method for producing a (meth)acrylic polymer particle of the present invention, a monomer having a (meth)acryloyl group is used as a main raw material. In the present invention, "(meth)acryl" means "at least one member of acryl and methacryl", "(meth)acryloyl" means "at least one member of acryloyl and methacryloyl", and "(meth)acrylate" means "at least one member of acrylate and methacrylate".

As a molecular mass of the (meth)acrylic polymer particle, mass average molecular mass of 10,000 to 2,000,000 is preferable. It is preferably 10,000 or more from the viewpoint of storage stability and storage stability of the plastisol composition, and 2,000,000 or less from the viewpoint of gelation properties at the time of film forming by heating. In particular, it is more preferably 1,500,000 or less because temperature during thermoforming can be lowered.

A particle structure of the (meth)acrylic polymer particle is preferably a multilayer structure in which each layer has a different composition or a gradient structure. In particular, a multilayer structure having 3 layers or more is preferable in which the innermost layer has compatibility with a plasticizer and the outer layer is less compatible than the former because storage stability, plasticizer retention, and pliability can be compatible.

As a state of the particle, for example, one having a secondary particle structure formed by agglomerating many primary particles which are obtained by polymerization or one having a higher order particle structure can be adopted. In such a case, it is preferable that primary particles be not strongly bound and be loosely agglomerated so that the agglomerated state be destroyed and primary particles be finely homogeneously dispersed in the plastisol by shear generated at the time of kneading the plastisol.

A primary particle diameter of the (meth)acrylic polymer particle is preferably 0.01 to 30 μm. When it is 0.01 μm or more, thickness of a layer that suppresses absorption of a plasticizer can be sufficiently provided when the polymer particle has the multilayer structure, so that storage stability of the plastisol is improved, and this is preferable. Further, it is preferably 30 μm or less from the viewpoint of gelation properties at the time of baking the plastisol. Further, a secondary particle diameter of the (meth)acrylic polymer particle is preferably 5 to 500 μm. When it is 5 μm or more, the handling property at the time of operation is improved. Further, when it is 500 μm or less, granular structures and the like originated from secondary particles which are not dispersed are reduced and appearance of products tends to be improved in the use of coating or a thin-film formed-article.

As the monomer (X) which is a raw material of monomer unit constituting the (meth)acrylic polymer particle, a publicly known monomer having a (meth)acryloyl group can be listed. As concrete examples, (meth)acrylates of linear alkyl alcohols such as methyl(meth)acrylate, ethyl(meth)acrylate, n-butyl(meth)acrylate, i-butyl(meth)acrylate, t-butyl(meth)acrylate, hexyl(meth)acrylate, 2-ethylhexyl(meth)acrylate, and octyl(meth)acrylate; (meth)acrylates of cyclic alkyl alcohols such as cyclohexyl(meth)acrylate; carboxyl group-containing monomers such as (meth)acrylic acid, acrylic acid, 2-methacryloyloxyethyl phthalate, and 2-methacryloyloxyethylhexahydro phthalate; sulfonic acid group-containing (meth)acrylates such as allyl sulfonic acid; phosphoric acid group-containing (meth)acrylates such as 2-(meth)acryloyloxyethyl acid phosphate; hydroxyl group-containing (meth)acrylates such as 2-hydroxyethyl(meth)acrylate and 2-hydroxypropyl(meth)acrylate; carbonyl group-containing (meth)acrylates such as acetoacetoxyethyl(meth)acrylate; (meth)acrylates of aromatic alcohols such as benzyl(meth)acrylate; and polyfunctional(meth)acrylates such as (poly)ethylene glycol di(meth)acrylate, propylene glycol di(meth)acrylate, 1,6-hexanediol di(meth)acrylate, and trimethylolpropane tri(meth)acrylate can be listed.

Further, besides the monomer having a (meth)acryloyl group, a monomer like a vinyl cyanide such as acrylonitrile; styrene or a styrene derivative such as α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, or p-phenyl styrene; a polyfunctional monomer such as divinyl benzene, divinyl naphtharene, divinyl ether, or triallyl isocyanurate; or an unsaturated acid or its derivative such as itaconic acid, crotonic acid, maleic acid, maleate, maleic anhydride, fumaric acid, or fumarate may be copolymerized when necessary. Further, a monomer (a) which will be mentioned later may be contained in the monomer (X) to the extent that it does not impair the object of the present invention.

The content of the monomer (X) in the raw material of the whole monomers to be used in the production of the (meth)acrylic polymer particle is 90 to 99.9% by mass. Polymerization of the monomer (X) may be carried out at one step or multi step.

In the method for producing a (meth)acrylic polymer particle of the present invention, the monomer mixture (Y) is polymerized in the presence of a polymer particle obtained by polymerizing the monomer (X).

When the monomer mixture (Y) is polymerized, the rate of polymerization of the monomer (X) is preferably 90% or more, more preferably 95% or more, and the most preferably 98% or more. When the rate of polymerization is 90% or more, a polymer of the monomer mixture (Y) is apt to accumulate at an outer layer of the (meth)acrylic polymer particle and thereby adhesive strength of the plastisol composition tends to become excellent.

By this method, basic nitrogen atoms or blocked isocyanate groups can be unevenly distributed at a surface layer of the polymer particle and thereby excellent adhesibility to a base material can be obtained. Further, a polymer originated from the monomer mixture (Y) is liable to absorb a plasticizer, however, an increase in viscosity at the time of storage caused by absorption of the plasticizer can be suppressed because the content of this resulting polymer is 10% by mass or less.

In particular, when the content of the polymer originated from the monomer mixture (Y) is 5% by mass or less, the amount of the monomer (a) to be used necessary for realizing a similar level of adhesibility can be very small.

The amount of the monomer mixture (Y) to be used is more preferably 3% by mass or less.

Further, when the content of the polymer originated from the monomer mixture (Y) is 0.01% by mass or more, the monomer mixture (Y) can be homogeneously polymerized with the polymer particle without being affected by stirring and the like at the time of polymerization.

The amount of the monomer mixture (Y) to be used is more preferably 1% by mass or more.

It is preferable to adjust a molecular mass by a polymerization initiator or chain transfer agent at the time of polymerizing the monomer mixture (Y). The mass average molecular mass of the polymer obtained from the monomer mixture (Y) is preferably 10,000 to 500,000. When the mass average molecular mass is 10,000 or more, adhesive strength tends to become excellent because the strength of an adhesive layer can hardly be lowered. Further, when the mass average molecular mass is 500,000 or less, the polymer containing basic nitrogen atoms becomes easily movable to the interface of the plastisol composition and a base material, in particular, at the time of baking of the plastisol composition so that adhesive strength tends to become excellent. Moreover, the adhesive strength tends almost not to be lowered even if the temperature at the time of baking is lowered.

A kind and an amount of addition of the foregoing chain transfer agent can be properly selected according to a kind of a polymerizable monomer to be jointly used. Chain transfer constants of chain transfer agents for each monomer can be obtained by referring to, for example, Polymer Handbook 3rd edition (edited by J. Brandup and E. H. Immergut, published by John Wiley & Sons, Inc.).

Examples of the chain transfer agents to be used include alkyl mercaptans such as n-butyl mercaptan, n-pentyl mercaptan, n-octyl mercaptan, n-lauryl mercaptan, and tert-dodecyl mercaptan; and thiophenols such as thiophenol, m-bromo thiophenol, p-bromo thiophenol, m-toluene thiol, and p-toluene thiol. In particular, it is preferable to use an alkyl mercaptan, namely, n-octyl mercaptan, n-lauryl mercaptan, or tert-dodecyl mercaptan. These chain transfer agents can also be used in a combination of a plurality of kinds.

Further, the amount of the chain transfer agent to be added is preferably 0.011% by mol or more and less than 1% by mol to the total amount of the monomer mixture (Y), and more preferably 0.03% by mol or more and less than 0.9% by mol from the viewpoint of improvement of adhesive strength.

In the present invention, the monomer (a) is the one having a nitrogen atom showing basicity originating from an unshared electron pair or having a blocked isocyanate as a functional group. Examples of the monomer (a) having a basic nitrogen atom include aliphatic amino(meth)acrylates such as dimethylaminoethyl(meth)acrylate and diethylaminoethyl(meth)acrylate; alicyclic amino(meth)acrylates; vinyl compounds having a heterocyclic ring such as N-vinyl imidazole, 2-vinyl pyridine, 4-vinyl pyridine, N-vinyl carbazole, N-vinyl imidazoline, and N-vinyl pyrrolidone; and vinyl aniline, vinyl benzyl amine, allyamine, and aminostyrene. Further, examples of the monomer (a) having a blocked isocyanate as a functional group include 2-[(3,5-dimethylpyrazolyl)carbonylamino]ethyl methacrylate and 2-[O-(1'-methylpropylideneamino)carboxyamino]ethyl methacrylate.

Among these compounds, vinyl compounds having a heterocyclic ring containing a nitrogen atom are preferably used because adhesibility to a base material can be realized with a small quantity of addition. In particular, vinyl compounds having a heterocyclic ring in which steric hindrance of the unshared electron pair on a nitrogen atom is small such as N-vinyl imidazole are most preferable.

As for the monomer having a blocked isocyanate as a functional group, a compound in which the deblocking is possible at a low temperature (from 50° C. to 120° C.) is preferable. As a concrete example, 2-[(3,5-dimethylpyrazolyl)carbonylamino]ethyl methacrylate can be listed. When the monomer having a blocked isocyanate as a functional group is used, products having excellent solvent resistance can be obtained because isocyanate groups combine with each other to crosslink at the time of baking of the plastisol composition.

When the content of the monomer (a) is 1% by mol or more in the monomer mixture (Y), adhesive strength to a base material becomes excellent. Further, when the content of the monomer (a) is 7% by mol or more, the adhesive strength to a base material tends to be excellent even if the temperature at the time of baking of the plastisol composition is low. The content of the monomer (a) is preferably 9% by mol or more and further preferably 10% by mol or more.

When the content of the monomer (a) is 80% by mol or less in the monomer mixture (Y), the amount of foreign matters which generates at the time of polymerization tends to become small. The content of the monomer (a) is preferably 40% by mol or less and further preferably 30% by mol or less.

The content of the monomer (a) is preferably 0.5% by mol or less in the total amount of the whole monomers (sum of X and Y). When the amount of the monomer (a) to be used is within this range, polymerization stability at the time of carrying out polymerization is improved and the (meth)acrylic polymer particle can be stably produced.

When the content of the monomer (b) is 5% by mol or more in the monomer mixture (Y), a polymer obtained from the monomer mixture (Y) is apt to become compatible with a plasticizer and the basic nitrogen atoms become easily movable to the interface of the plastisol composition and a base material, in particular, at the time of baking of the plastisol composition, so that adhesibility to the base material becomes excellent. When the content of the monomer (b) is 7% by mol or more and further 10% by mol or more, adhesive strength to the base material tends to be excellent even if the temperature at the time of baking of the plastisol composition is low.

Further, when the content of the monomer (b) is 80% by mol or less, strength of an adhesive layer caused by, in particular, plasticization of a plasticizer can be suppressed. The content of the monomer (b) is preferably 40% by mol or less and more preferably 30% by mol or less.

Concrete examples of the monomer (b) include (meth)acrylates of linear alkyl alcohols such as ethyl(meth)acrylate, n-butyl(meth)acrylate, i-butyl(meth)acrylate, t-butyl(meth)acrylate, hexyl(meth)acrylate, 2-ethylhexyl(meth)acrylate, and octyl(meth)acrylate; (meth)acrylates of aromatic alcohols such as benzyl(meth)acrylate; and (meth)acrylates of cyclic alkyl alcohols such as cyclohexyl(meth)acrylate.

In the present invention, another monomer (c) is contained in the range of from 0 to 94% by mol in the monomer mixture (Y).

The content of the other monomer (c) is preferably 86% by mol or less and more preferably 80% by mol or less.

As the other monomer (c), the same monomers as those in the monomer (X) can be used.

The compositional ratio of the monomer mixture (Y) is preferably 7 to 40% by mol of the monomer (a), 7 to 40% by mol of the monomer (b), and 20 to 86% by mol of the other monomer (c).

The more preferable compositional ratio is 10 to 30% by mol of the monomer (a), 10 to 30% by mol of the monomer (b), and 40 to 80% by mol of the other monomer (c).

Adhesive strength, storage stability, and polymerization stability are improved by making the content of each monomer be in this range.

As a method for producing a (meth)acrylic polymer particle, a publicly known method for producing a polymer particle can be properly selected. For example, a method for preparing a dispersion liquid of (meth)acrylic polymer particles by an emulsion polymerization method, seed polymerization method, soap-free polymerization method, dispersion polymerization method, fine suspension polymerization method followed by pulverizing the dispersion liquid using a spray-drying method, coagulation by acid or coagulation by salt followed by a drying process, freeze-drying method, or centrifugation method can be listed.

The plastisol composition of the present invention can be obtained by dispersing the (meth)acrylic polymer particle obtained by the aforementioned method in a plasticizer.

The plasticizer can be properly selected from publicly known plasticizers and used. Concrete examples of the plasticizer include phthalate based plasticizers such as dimethyl phthalate, diethyl phthalate, dibutyl phthalate, diheptyl phthalate, di-2-ethylhexyl phthalate, di-n-octyl phthalate, diisononyl phthalate, diisodecyl phthalate, and butylbenzyl phthalate; adipate based plasticizers such as dimethyl adipate, dibutyl adipate, diisobutyl adipate, dihexyl adipate, di-2-ethylhexyl adipate, diisononyl adipate, and dibutyldiglycol adipate; phosphate based plasticizers such as trimethyl phosphate, triethyl phosphate, tributyl phosphate, tri-2-ethylhexyl phosphate, tributoxyethyl phosphate, triphenyl phosphate, tricresyl phosphate, trixylenyl phosphate, and cresylphenyl phosphate; trimeritate based plasticizers such as tri-2-ethylhexyl trimellitate; sebacate based plasticizers such as dimethyl sebacate, dibutyl sebacate, and di-2-ethylhexyl sebacate; aliphatic polyester based plasticizers such as poly-1,3-butanediol adipate; benzoic acid based plasticizers such as diethylene glycol dibenzoate and dibutylene glycol dibenzoate; epoxidized ester based plasticizers such as epoxidized soybean oil; alkyl sulfonic acid phenyl ester based plasticizers such as alkyl phenyl sulfonate; alicyclic dibasic acid ester based plasticizers; polyether based plasticizers such as polypropylene glycol and polybutylene glycol; and citric acid based plasticizers such as acetyltributyl citrate.

Among these compounds, it is preferable to use diisononyl phthalate as a main component from the viewpoint of compatibility with the (meth)acrylic polymer particle, economic feasibility, safety, and availability.

Various additives like pigments such as calcium carbonate, titanium oxide, and carbon black; anti-foaming agents; mildewproofing agents; deodorants; anti-bacterial agents; surfactants; lubricants; ultraviolet light absorbers; perfumes; foaming agents; leveling agents; adhesives; thinners; and diluents may be properly compounded in the plastisol composition of the present invention, when necessary, to the extent that they do not impair the effect of the present invention.

As a kneading apparatus for producing the plastisol composition of the present invention, the one publicly known may be properly used.

Concrete examples of the kneading apparatus include a pony mixer, change-can mixer, hobert mixer, planetary mixer, butterfly mixer, mortar autogrinder, and kneader.

The plastisol composition of the present invention can be cured by a publicly known heating method, shaping method, or gelation method.

The plastisol composition of the present invention is used for coating materials such as automotive undercoats, auto body sealers, wall papers, carpet backings, floor materials, and paints; shaped articles such as toys; and the same uses as those of conventional plastisol compositions.

In the case of using the plastisol composition of the present invention as a coating material, a publicly known coating method may be properly adopted as the coating method.

Concrete examples of a method for coating the plastisol composition on a base material include a dip coating method, spray coating method, knife coating method, roll coating method, curtain flow coating method, brush painting coating method, and electrostatic coating method. An article having an objective coating layer can be obtained by baking a coating film of the plastisol composition.

As articles using the plastisol composition of the present invention, the same articles using conventional plastisol compositions can be listed. Examples thereof include auto bodies, wall papers, carpets, floor materials, paints, and toys.

EXAMPLES

Hereinafter, the present invention will be explained using Examples. The evaluation methods and the standards of the evaluation in the examples are as follows.

(1) Mass Average Molecular Mass (Mw)

Mw of the (meth)acrylic polymer particle was measured using GPC (gel permeation chromatography) with respect to a polystyrene standard resin as a standard.

(2) Adhesive Strength

Two cation electrodeposition plates, each having width of 25 mm, length of 140 mm, and thickness of 0.8 mm (manufactured by Japan Route Service Co.), were overlapped with each other at the length of 25 mm, and a plastisol composition was filled in the overlapped space so as to have an area of 25 mm square and thickness of 3 mm, and the resultant system was heated at 120° C. for 20 minutes or at 140° C. for 20 minutes to obtain a test piece, for which adhesive strength under shear was measured under the atmosphere of 25° C. and the rate of pulling of 50 mm/min.

A: 1.3 MPa or more
B: 1.0 MPa or more and less than 1.3 MPa
C: 0.8 MPa or more and less than 1.0 MPa
D: less than 0.8 MPa (3) Rate of Viscosity Increase A plastisol composition was placed in a temperature controlled bath at 25° C. for 2 hours, and viscosity ($\alpha$) (unit: mPa·s) after the elapse of 1 minute rotating was measured using EHD viscometer (trade name EHD viscometer, manufactured by Tokyo Keiki Inc., rotor of special cone (cone angle of 3 degrees)) at a rotational frequency of 5 rpm. Further, viscosity ($\beta$) after the elapse of 5 days and 10 days of storage under the atmosphere of 40° C. were measured. The rate of viscosity increase (%) was obtained using the following formula (1), based on these measured values, and storage stability was evaluated based on the following standard.

$$\text{Rate of viscosity increase (\%)} = \{(\beta-\alpha)/\alpha\} \times 100 \quad (1)$$

A: less than 800% (after the elapse of 10 days of storage)
B: less than 800% (after the elapse of 5 days of storage)
C: 800% or more (after the elapse of 5 days of storage)

Example 1

In this example, 3 kinds of monomer mixtures (X0), (X1), and (X2) were used as the monomer (X).

To a 2 litter-4 necked flask equipped with a thermometer, nitrogen gas introducing-tube, stirring rod, dropping funnel and condenser tube, 408 g of pure water was introduced, and nitrogen gas was sufficiently passed through the pure water for 30 minutes to replace dissolved oxygen in the pure water. After the passing of nitrogen gas was stopped, the pure water was heated to 80° C. while stirred with 200 rpm. When the inside temperature reached at 80° C., a mixture (monomer (X0)) of 20 g of methyl methacrylate, 15 g of n-butyl methacrylate, and 0.3 g of potassium persulfate was collectively added into the flask. Subsequently, a mixture (monomer (X1)) of 176 g of methyl methacrylate, 134 g of n-butyl methacrylate, 3.0 g of sodium dialkylsulfosuccinate (trade name: PELEX OT-P, manufactured by KAO Corporation), and 150 g of pure water was dropped into the flask over the period of 2.5 hours to carry out polymerization. Subsequently, a mixture (monomer (X2)) of 248 g of methyl methacrylate, 88 g of i-butyl methacrylate, 2.8 g of PELEX OT-P, and 141 g of pure water was dropped into the flask over the period of 2.4 hours to produce polymer particles. Further, a monomer mixture (Y) of 14.3 g of methyl methacrylate, 2.27 g of i-butyl methacrylate, 1.50 g of N-vinyl imidazole (manufactured by BASF Corporation), 0.2 g of PELEX OT-P, and 9.0 g of pure water was dropped into the flask over the period of 0.2 hours in the presence of the polymer particles. Subsequently, stirring was continued for 1 hour at 80° C. to finish the polymerization and obtained a dispersion liquid of (meth) acrylic polymer particles.

The dispersion liquid of (meth)acrylic polymer particles was spray dried using a L-8 type spray dryer (manufactured by Ohkawara Kakohki Co., Ltd.) (inlet and outlet temperatures being 150 and 60° C., respectively, and rotational disk frequency being 25,000 rpm) to obtain (meth)acrylic polymer particles (P1). The rate of polymerization of the monomer (X) before the monomer mixture (Y) was dropped is shown in Table 2. The content of the monomer mixture (Y) in the total amount of the whole monomers (% by mass), the content of each monomer in the monomer mixture (Y) (% by mol), and the content of the monomer (a) used in the total amount of the whole monomers (% by mol) are shown in Table 3.

Subsequently, 100 parts of calcium carbonate (50 parts of SOFTON 1000 (trade name) and 50 parts of RIGHTON 26A (trade name), both manufactured by BIHOKU FUNKA KOGYO CO., LTD.) and 140 parts of a plasticizer (di-isononyl phthalate, manufactured by J-PLUS Co., Ltd.) were measured and mixed for 10 seconds under atmospheric pressure (0.1 MPa) and then mixed for 170 seconds under reduced pressure of 2.7 kPa using a vacuum mixer (trade name ARV-200, manufactured by THINKY Corporation) to obtain a preliminary mixture of calcium carbonate and the plasticizer. Subsequently, to the resultant mixture, 100 parts of the (meth) acrylic polymer particles (P1) were mixed for 10 seconds under atmospheric pressure (0.1 MPa) and then mixed for 110 seconds under reduced pressure of 2.7 kPa using the vacuum mixer to obtain a plastisol composition. The results of evaluation of the plastisol composition are shown in Table 4.

In this example, the content of the monomer mixture (Y) was 2.58% by mass, and 9.16% by mol of N-vinyl imidazole as the monomer (a) and 9.0% by mol of i-butyl methacrylate as the monomer (b) were contained in the monomer mixture (Y), and adhesibility and storage stability of the plastisol composition were excellent.

Examples 2 to 16 and Comparative Examples 1 to 8

The compositions and drop-times of the monomer (X) and the monomer mixture (Y) were changed according to Tables 1 and 2, and as for the other conditions, the same conditions as those of Example 1 were adopted, and (meth)acrylic polymer particles (P2 to P24) were obtained. As for the (meth) acrylic polymer particles (P10), polymerization was carried out by reducing the amount of potassium persulfate, which is a polymerization initiator, to one fifth of that in Example 1. As the results of measurements of GPC (gel permeation chromatography) with respect to a polystyrene standard resin, Mw of the (meth)acrylic polymer particles (P2) was 655,000 and Mw of the (meth)acrylic polymer particles (P10) was 799,000. Further, in Comparative Example 3 and Examples 11 to 16, 4 kinds of monomer mixtures (X0), (X1), (X2), and (X3) were used as the monomer (X).

The rate of polymerization of the monomer (X) before the monomer mixture (Y) was dropped is shown in Table 2. The content of the monomer mixture (Y) in the total amount of the whole monomers (% by mass), the content of each monomer in the monomer mixture (Y) (% by mol), and the content of the monomer (a) used in the total amount of the whole monomers (% by mol) are shown in Table 3.

Subsequently, the same procedures as in Example 1 were carried out using the obtained (meth)acrylic polymer particles (P2 to P24) to obtain plastisol compositions. The results of evaluation of the obtained plastisol compositions are shown in Table 4.

In each of Examples 2 and 3, the content of the monomer (b) in the monomer mixture (Y) was changed to 27.4% by mol and 35.6% by mol, respectively, and adhesive strength was particularly excellent in Example 2. In Example 4, methyl methacrylate was contained in a large amount in the monomer (X2), and storage stability was excellent. In Example 5, the content of the monomer mixture (Y) was large, and adhesibility was excellent. In each of Examples 6 and 7, a chain transfer agent (n-octyl mercaptan) was added at the time of polymerization of the monomer mixture (Y), and adhesive strength was almost not lowered even though the baking temperature was low. In each of Examples 8 and 9, the content of the monomer (a) in the monomer mixture (Y) was changed to 33.3% by mol and 16.7% by mol, respectively, and adhesive strength was particularly excellent in Example 9. In Example 10, a polymerization initiator was added at the time of polymerization of the monomer mixture (X), and besides, a chain transfer agent was added at the time of polymerization of the monomer mixture (Y), and it showed the same characteristics as Example 5.

In Example 11, 2-[(3,5-dimethylpyrazolyl)carbonylamino]ethyl methacrylate was used for the monomer mixture (Y), and adhesibility and storage stability were excellent as in the case of using N-vinyl imidazole. Further, in each of Examples 12 and 13, a chain transfer agent was added at the time of polymerization of the monomer mixture (Y), and adhesive strength was excellent even in the case of low baking temperature, in particular, in Example 12. In each of Examples 14 and 15, the amount of the monomer mixture (Y) was changed, and adhesibility and storage stability were excellent in both cases. In Example 16, 2-[O-(1'-methylpropylideneamino)carboxyamino]ethyl methacrylate was used for the monomer mixture (Y), and adhesibility and storage stability were excellent. Further, in each of Examples 11 to 16, a shaped article was not melted by an organic solvent (acetone) and solvent resistance was excellent in all cases.

Further, in any of these Examples, the amount of the monomer (a) used was 1.0% by mol or less in the whole monomers, however, adhesive strength and storage stability were excellent in spite of a small amount of the monomer (a) used. In particular, in the Example where the amount of the monomer (a) used was 0.5% by mol or less, stability at the time of polymerization was also excellent.

In Comparative Example 1, the content of the monomer mixture (Y) and the content of the monomer (a) were out of the ranges prescribed in the present invention, and both adhesibility and storage stability were low. Further, in Comparative Example 2, the content of the monomer mixture (Y) was out of the range prescribed in the present invention, and storage stability was low.

In Comparative Example 3, the content of the monomer (b) in the monomer mixture (Y) was out of the range prescribed in the present invention, and adhesive strength was low.

In Comparative Example 4, the monomer mixture (Y) was composed only of the monomer (a), and adhesive strength was insufficient.

In Comparative Example 5, the content of the monomer (a) in the monomer mixture (Y) was out of the range prescribed in the present invention, and adhesive strength was insufficient.

In each of Comparative Examples 6 and 7, the content of the monomer (b) in the monomer mixture (Y) was out of the range prescribed in the present invention, and adhesive strength was insufficient.

In Comparative Example 8, the amount of the monomer mixture (Y) used was out of the range prescribed in the present invention, and storage stability was low.

TABLE 1

| | Monomer mixture (X1) | | | | | Monomer mixture (X2) | | | | |
|---|---|---|---|---|---|---|---|---|---|---|
| | MMA | nBMA | PELEX OT-P | Pure water | Drop time | MMA | iBMA | PELEX OT-P | Pure water | Drop time |
| Ex. 1 | 176 | 134 | 3 | 150 | 2.5 | 248 | 88 | 2.8 | 141 | 2.4 |
| Ex. 2 | 176 | 134 | 3 | 150 | 2.5 | 248 | 88 | 2.8 | 141 | 2.4 |
| Ex. 3 | 176 | 134 | 3 | 150 | 2.5 | 248 | 88 | 2.8 | 141 | 2.4 |
| Ex. 4 | 176 | 134 | 3 | 150 | 2.5 | 268 | 67 | 2.8 | 141 | 2.4 |
| Ex. 5 | 176 | 134 | 3 | 150 | 2.5 | 239 | 60 | 2.5 | 123 | 2 |
| Ex. 6 | 176 | 134 | 3 | 150 | 2.5 | 248 | 88 | 2.8 | 141 | 2.4 |
| Ex. 7 | 176 | 134 | 3 | 150 | 2.5 | 248 | 88 | 2.8 | 141 | 2.4 |
| Ex. 8 | 176 | 134 | 3 | 150 | 2.5 | 248 | 88 | 2.8 | 141 | 2.4 |
| Ex. 9 | 176 | 134 | 3 | 150 | 2.5 | 248 | 88 | 2.8 | 141 | 2.4 |
| Ex. 10 | 176 | 134 | 3 | 150 | 2.5 | 248 | 88 | 2.8 | 141 | 2.4 |
| Ex. 11 | 166 | 116 | 3 | 141 | 2.5 | 163 | 77 | 2.4 | 120 | 2 |
| Ex. 12 | 166 | 116 | 3 | 141 | 2.5 | 163 | 77 | 2.4 | 120 | 2 |
| Ex. 13 | 166 | 116 | 3 | 141 | 2.5 | 163 | 77 | 2.4 | 120 | 2 |
| Ex. 14 | 166 | 116 | 3 | 141 | 2.5 | 163 | 77 | 2.4 | 120 | 2 |
| Ex. 15 | 166 | 116 | 3 | 141 | 2.5 | 163 | 77 | 2.4 | 120 | 2 |
| Ex. 16 | 166 | 116 | 3 | 141 | 2.5 | 163 | 77 | 2.4 | 120 | 2 |
| Comp. Ex. 1 | 176 | 134 | 3 | 150 | 2.5 | — | — | — | — | — |
| Comp. Ex. 2 | 176 | 134 | 3 | 150 | 2.5 | — | — | — | — | — |
| Comp. Ex. 3 | 160 | 122 | 3 | 141 | 2.4 | 177 | 63 | 2.7 | 120 | 2 |
| Comp. Ex. 4 | 176 | 134 | 3 | 150 | 2.5 | 248 | 88 | 2.8 | 141 | 2.4 |
| Comp. Ex. 5 | 176 | 134 | 3 | 150 | 2.5 | 248 | 88 | 2.8 | 141 | 2.4 |
| Comp. Ex. 6 | 176 | 134 | 3 | 150 | 2.5 | 248 | 88 | 2.8 | 141 | 2.4 |
| Comp. Ex. 7 | 176 | 134 | 3 | 150 | 2.5 | 248 | 88 | 2.8 | 141 | 2.4 |
| Comp. Ex. 8 | 176 | 134 | 3 | 150 | 2.5 | 172 | 61 | 1.8 | 84 | 1.5 |

MMA: methyl methacrylate (manufactured by Mitsubishi Rayon Co., Ltd.)
NBMA: n-butyl methacrylate (manufactured by Mitsubishi Rayon Co., Ltd.)
IBMA: i-butyl methacrylate (manufactured by Mitsubishi Rayon Co., Ltd.)
PELEX OT-P: sodium dialkylsulfosuccinate (manufactured by KAO Corporation)

TABLE 2

| | Monomer mixture (X3) | | | | | Rate of polymerization of monomer (X) (% by mass) | Monomer mixture (Y) | | | | | | | |
|---|---|---|---|---|---|---|---|---|---|---|---|---|---|---|
| | MMA | iBMA | PELEX OT-P | Pure water | Drop time | | MMA | iBMA | N-vinyl imidazole | Karenz MOI-BP | Karenz MOI-BM | n-octyl mercaptan | PELEX OT-P | Pure water | Drop time |
| Ex. 1 | — | — | — | — | — | 99.8 | 14.3 | 2.27 | 1.50 | — | — | — | 0.2 | 9 | 0.2 |
| Ex. 2 | — | — | — | — | — | 99.7 | 10.3 | 6.30 | 1.38 | — | — | — | 0.2 | 9 | 0.2 |
| Ex. 3 | — | — | — | — | — | 99.6 | 8.9 | 8.10 | 1.34 | — | — | — | 0.2 | 9 | 0.2 |
| Ex. 4 | — | — | — | — | — | 99.9 | 10.3 | 6.30 | 1.38 | — | — | — | 0.2 | 9 | 0.2 |
| Ex. 5 | — | — | — | — | — | 99.7 | 31 | 18.9 | 4.08 | — | — | — | 0.5 | 27 | 0.6 |
| Ex. 6 | — | — | — | — | — | 99.6 | 10.3 | 6.30 | 1.38 | — | — | 0.018 | 0.2 | 9 | 0.2 |
| Ex. 7 | — | — | — | — | — | 99.6 | 10.3 | 6.30 | 1.38 | — | — | 0.009 | 0.2 | 9 | 0.2 |
| Ex. 8 | — | — | — | — | — | 99.6 | 7.9 | 4.80 | 5.30 | — | — | — | 0.2 | 9 | 0.2 |
| Ex. 9 | — | — | — | — | — | 99.8 | 9.6 | 5.80 | 2.57 | — | — | — | 0.2 | 9 | 0.2 |
| Ex. 10 | — | — | — | — | — | 99.6 | 10.3 | 6.30 | 1.38 | — | — | 0.018 | 0.2 | 9 | 0.2 |
| Ex. 11 | 60 | — | 0.6 | 30 | 0.5 | 99.7 | 9.17 | 5.58 | — | 3.25 | — | — | 0.2 | 9 | 0.2 |
| Ex. 12 | 60 | — | 0.6 | 30 | 0.5 | 99.8 | 9.17 | 5.58 | — | 3.25 | — | 0.018 | 0.2 | 9 | 0.2 |
| Ex. 13 | 60 | — | 0.6 | 30 | 0.5 | 99.8 | 9.17 | 5.58 | — | 3.25 | — | 0.18 | 0.2 | 9 | 0.2 |

TABLE 2-continued

| | Monomer mixture (X3) | | | | | Rate of polymerization of monomer (X) (% by mass) | Monomer mixture (Y) | | | | | | | | |
|---|---|---|---|---|---|---|---|---|---|---|---|---|---|---|---|
| | MMA | iBMA | PELEX OT-P | Pure water | Drop time | | MMA | iBMA | N-vinyl imidazole | Karenz MOI-BP | Karenz MOI-BM | n-octyl mercaptan | PELEX OT-P | Pure water | Drop time |
| Ex. 14 | 60 | — | 0.6 | 30 | 0.5 | 99.7 | 30.6 | 18.6 | — | 10.9 | — | 0.06 | 0.6 | 30 | 0.5 |
| Ex. 15 | 60 | — | 0.6 | 30 | 0.5 | 99.9 | 3.06 | 1.86 | — | 1.08 | — | 0.006 | 0.1 | 3 | 0.1 |
| Ex. 16 | 60 | — | 0.6 | 30 | 0.5 | 99.8 | 9.23 | 5.61 | — | — | 3.16 | 0.018 | 0.2 | 9 | 0.2 |
| Comp. Ex. 1 | — | — | — | — | — | 99.9 | 219 | 133.0 | 1.44 | — | — | — | 3 | 150 | 2.5 |
| Comp. Ex. 2 | — | — | — | — | — | 99.8 | 212 | 130.0 | 12.0 | — | — | — | 3 | 150 | 2.5 |
| Comp. Ex. 3 | 60 | — | 0.3 | 30 | 0.6 | 99.8 | 16.5 | — | 1.50 | — | — | 0.018 | 0.2 | 9 | 0.2 |
| Comp. Ex. 4 | — | — | — | — | — | 99.6 | — | — | 1.5 | — | — | — | — | 9 | 0.2 |
| Comp. Ex. 5 | — | — | — | — | — | 99.6 | 11.2 | 6.78 | 0.07 | — | — | — | 0.2 | 9 | 0.2 |
| Comp. Ex. 6 | — | — | — | — | — | 99.9 | 15.3 | 1.15 | 1.52 | — | — | — | 0.2 | 9 | 0.2 |
| Comp. Ex. 7 | — | — | — | — | — | 99.7 | 0.36 | 16.51 | 1.13 | — | — | — | 0.2 | 9 | 0.2 |
| Comp. Ex. 8 | — | — | — | — | — | 99.6 | 57.1 | 54.0 | 8.93 | — | — | — | 1.2 | 60 | 1.0 |

Karenz MOI-BP: 2-[(3,5-dimethylpyrazolyl)carbonylamino]ethyl methacrylate (manufactured by Showa Denko K.K.)
Karenz MOI-BM: 2-[O-(1'-methylpropylideneamino)carboxyamino]ethyl methacrylate (manufactured by Showa Denko K.K.)

TABLE 3

| | Content of the monomer mixture (Y) in the total amount of the whole monomers (% by mass) | Ratio of monomers in the monomer mixture (Y) (% by mol) | | | | | Content of the monomer (a) in the total amount of the whole monomers (% by mol) | Amount of addition of chain transfer agent (% by mol) | Polymer particle |
|---|---|---|---|---|---|---|---|---|---|
| | | MMA | iBMA | N-vinyl imidazole | Karenz MOI-BP | Karenz MOI-BM | | | |
| Ex. 1 | 2.58 | 81.9 | 9 | 9.16 | — | — | 0.27 | — | P1 |
| Ex. 2 | 2.57 | 63.6 | 27.4 | 9.05 | — | — | 0.25 | — | P2 |
| Ex. 3 | 2.57 | 55.5 | 35.6 | 8.9 | — | — | 0.24 | — | P3 |
| Ex. 4 | 2.58 | 63.6 | 27.4 | 9.05 | — | — | 0.25 | — | P4 |
| Ex. 5 | 7.73 | 63.7 | 27.4 | 8.92 | — | — | 0.72 | — | P5 |
| Ex. 6 | 2.57 | 63.6 | 27.4 | 9.05 | — | — | 0.25 | 0.08 | P6 |
| Ex. 7 | 2.57 | 63.6 | 27.4 | 9.05 | — | — | 0.25 | 0.04 | P7 |
| Ex. 8 | 2.57 | 46.7 | 20 | 33.3 | — | — | 0.94 | — | P8 |
| Ex. 9 | 2.57 | 58.5 | 24.9 | 16.7 | — | — | 0.46 | — | P9 |
| Ex. 10 | 2.57 | 63.6 | 27.4 | 9.05 | — | — | 0.25 | 0.08 | P10 |
| Ex. 11 | 2.57 | 63.6 | 27.3 | — | 9.08 | — | 0.24 | — | P11 |
| Ex. 12 | 2.84 | 63.6 | 27.3 | — | 9.08 | — | 0.24 | 0.09 | P12 |
| Ex. 13 | 2.84 | 63.6 | 27.3 | — | 9.08 | — | 0.24 | 0.86 | P13 |
| Ex. 14 | 8.87 | 63.6 | 27.3 | — | 9.08 | — | 0.76 | 0.09 | P14 |
| Ex. 15 | 0.96 | 63.6 | 27.3 | — | 9.08 | — | 0.08 | 0.09 | P15 |
| Ex. 16 | 2.84 | 63.6 | 27.3 | — | — | 9.08 | 0.22 | 0.09 | P16 |
| Comp. Ex. 1 | 53.3 | 69.7 | 29.9 | 0.49 | — | — | 0.26 | — | P17 |
| Comp. Ex. 2 | 53.3 | 67 | 28.9 | 4.04 | — | — | 2.18 | — | P18 |
| Comp. Ex. 3 | 3.00 | 91.2 | — | 8.83 | — | — | 0.27 | 0.07 | P19 |
| Comp. Ex. 4 | 0.23 | — | — | 100 | — | — | 0.27 | — | P20 |
| Comp. Ex. 5 | 2.57 | 69.7 | 29.9 | 0.4 | — | — | 0.01 | — | P21 |
| Comp. Ex. 6 | 2.57 | 86.5 | 4.5 | 9 | — | — | 0.27 | — | P22 |
| Comp. Ex. 7 | 2.57 | 2.7 | 88.1 | 9.2 | — | — | 0.2 | — | P23 |
| Comp. Ex. 8 | 18.1 | 54.3 | 36.4 | 9.1 | — | — | 1.61 | — | P24 |

TABLE 4

| | Polymer particle | Adhesive strength (MPa) | | Rate of viscosity increase (%) | | Coagulated materials at the time of polymerization (% by mass) |
|---|---|---|---|---|---|---|
| | | 140° C. × 20 min | 120° C. × 20 min | 40° C. × 5 days of storage | 40° C. × 10 days of storage | |
| Ex. 1 | P1 | 1.1 B | 0.8 C | 139 B | 275 A | — |
| Ex. 2 | P2 | 1.5 A | 1.0 B | 535 B | >800 D | 0.06 |
| Ex. 3 | P3 | 1.0 B | — | 631 B | — | — |
| Ex. 4 | P4 | 1.2 B | 1.0 B | 106 B | 440 A | — |
| Ex. 5 | P5 | 1.5 A | — | 89 B | 309 A | 0.09 |
| Ex. 6 | P6 | 1.5 A | 1.5 A | 690 B | >800 D | — |
| Ex. 7 | P7 | 1.5 A | 1.5 A | 668 B | >800 D | — |

TABLE 4-continued

|  | Polymer particle | Adhesive strength (MPa) | | | | Rate of viscosity increase (%) | | | | Coagulated materials at the time of polymerization (% by mass) |
|---|---|---|---|---|---|---|---|---|---|---|
|  |  | 140° C. × 20 min | | 120° C. × 20 min | | 40° C. × 5 days of storage | | 40° C. × 10 days of storage | | |
| Ex. 8 | P8 | 1.1 | B | — | — | 166 | B | — | — | — |
| Ex. 9 | P9 | 1.6 | A | 1.3 | A | 315 | B | — | — | — |
| Ex. 10 | P10 | 1.5 | A | 1.5 | A | 670 | B | — | — | — |
| Ex. 11 | P11 | 1.3 | A | 1.1 | B | 485 | B | — | — | — |
| Ex. 12 | P12 | 1.6 | A | 1.5 | A | 506 | B | 422 | A | 0.05 |
| Ex. 13 | P13 | 1.3 | A | 1.2 | B | 163 | B | 200 | A | — |
| Ex. 14 | P14 | 1.5 | A | 1.5 | A | 303 | B | 287 | A | 0.09 |
| Ex. 15 | P15 | 1.3 | A | 1.0 | B | 284 | B | 428 | A | — |
| Ex. 16 | P16 | 1.2 | B | 1.1 | B | 163 | B | 368 | A | — |
| Comp. Ex. 1 | P17 | 0.1 | D | — | — | >800 | D | — | — | — |
| Comp. Ex. 2 | P18 | 1.2 | B | — | — | >800 | D | — | — | 0.61 |
| Comp. Ex. 3 | P19 | 0.4 | D | — | — | 23 | B | 54 | A | — |
| Comp. Ex. 4 | P20 | 0.2 | D | — | — | 111 | B | — | — | — |
| Comp. Ex. 5 | P21 | 0.2 | D | — | — | >800 | D | — | — | — |
| Comp. Ex. 6 | P22 | 0.7 | D | 0.7 | D | 162 | B | — | — | — |
| Comp. Ex. 7 | P23 | 0.2 | D | — | — | 381 | B | — | — | — |
| Comp. Ex. 8 | P24 | 1.5 | A | 1.4 | A | >800 | D | — | — | — |

INDUSTRIAL APPLICABILITY

The (meth)acrylic polymer particle, and the plastisol and the article using the (meth)acrylic polymer particle, of the present invention can realize compatibility of adhesibility and storage stability in high degree in the case that it is used in plastisols and hence can be used commercially.

What is claimed is:

1. A method for producing a (meth)acrylic polymer particle for a plastisol wherein a surface layer is produced by polymerizing a monomer mixture (Y), comprising:
   polymerizing a monomer (X) having a (meth)acryloyl group to produce a polymer particle, and
   polymerizing a monomer mixture (Y) in the presence of the polymer particle,
   wherein the monomer (X) is 90 to 99.9% by mass and the monomer mixture (Y) is 0.1 to 10% by mass in terms of the ratio among monomer raw materials to be supplied for polymerization; and the monomer mixture (Y) comprises 1 to 80% by mol of a monomer (a) having a blocked isocyanate as a functional group which is capable of deblocking at 50 to 120° C., 5 to 80% by mol of a (meth)acrylate monomer (b) of at least one alcohol selected from the group consisting of an aliphatic alcohol having 2 or more carbon atoms, an aromatic alcohol, and a cyclic alkyl alcohol, and 0 to 94% by mol of a monomer (c) other than the monomer (a) and the monomer (b), and
   wherein 0.01 to 1% by mol of a chain transfer agent to the total amount of the monomer mixture (Y) is added when the monomer mixture (Y) is polymerized.

2. The method for producing a (meth)acrylic polymer particle for a plastisol according to claim 1, wherein the content of the monomer (a) having a blocked isocyanate as a functional group which is capable of deblocking at 50 to 120° C. is 7 to 80% by mol in the monomer mixture (Y).

3. A (meth)acrylic polymer particle for a plastisol produced by the method of claim 1.

4. A plastisol composition comprising the (meth)acrylic polymer particle for a plastisol of claim 3.

5. An article comprising the plastisol composition of claim 4.

6. The plastisol composition according to claim 4 having an adhesive strength of 1.0 MPa or more when measured at 25° C. with a rate of pulling of 50 mm/min, wherein the adhesive strength is measured using a system as follows:
   two cation electrodeposition plates, each having a width of 25 mm, length of 140 mm, and thickness of 0.8 mm, overlap each other at a length of 25 mm, the plastisol composition is filled in the overlapped space so as to have an area of 25 mm square and a thickness of 3 mm, the resultant system is heated at 120° C. for 20 minutes or at 140° C. for 20 minutes.

7. The method according to claim 1, wherein monomer mixture (Y) is present in amount of from 1 to 3% by mass in terms of the ratio among monomer raw materials to be supplied for polymerization.

8. The method according to claim 1, wherein monomer (a) comprises 2-[(3,5-dimethylpyrazolyl)carbonylamino]ethyl methacrylate.

9. The method according to claim 1, wherein monomer (a) comprises 2-[O-(1'-methylpropylideneamino)carboxyamino]ethyl methacrylate.

10. The method according to claim 1, wherein monomer (a) is present in an amount of 10 to 30% by mol.

11. The method according to claim 1, wherein monomer (b) is present in an amount of 10 to 30% by mol.

12. The method according to claim 1, wherein monomer (a) is present in an amount of 10 to 30% by mol, monomer (b) is present in an amount of 10 to 30% by mol, and monomer (c) is present in an amount of 40 to 80% by mol.

13. The method according to claim 1, wherein blocked isocyanate groups are unevenly distributed at a surface layer of the polymer particle.

* * * * *